(12) United States Patent
Draghetti et al.

(10) Patent No.: US 6,892,358 B2
(45) Date of Patent: May 10, 2005

(54) METHOD AND AUTOMATIC MACHINE FOR PROCESSING A PRODUCT

(75) Inventors: Fiorenzo Draghetti, Medicina (IT); Verter Cesari, Granarolo Dell'Emilia (IT); Maurizio Maglioni, Bologna (IT); Daniela Albertini, Castelfranco Emilia (IT); Stefano Pareschi, S. Giorgio Di Piano (IT)

(73) Assignee: G.D. Societa 'per Azioni, Battindarno (IT)

( * ) Notice: Subject to any disclaimer, the term of this patent is extended or adjusted under 35 U.S.C. 154(b) by 543 days.

(21) Appl. No.: 09/978,843

(22) Filed: Oct. 17, 2001

(65) Prior Publication Data

US 2002/0062159 A1 May 23, 2002

(30) Foreign Application Priority Data

Oct. 18, 2000 (IT) ...................................... BO2000A0608

(51) Int. Cl.$^7$ .............................. G06F 3/00; G06F 3/14
(52) U.S. Cl. ....................... 715/771; 715/705; 715/709; 715/811; 715/964; 715/970; 345/419; 345/420; 345/649; 345/655; 700/17; 700/65; 700/83; 700/95
(58) Field of Search ................................ 715/700, 705, 715/709, 764, 771, 772, 781, 810, 811, 835, 836, 838, 839, 844, 846, 848, 853, 964, 970, 976, 977, 978; 345/419, 420, 473, 619, 649, 650, 653–656, 700, 705, 709, 764, 765, 771, 772, 781, 810, 811, 835, 836, 838, 839, 844, 848, 853, 964, 970, 976, 977, 978; 700/17, 64, 65, 83, 90, 91, 95, 97, 98, 108; 702/179, 181, 182, 183, 185, 187, 188

(56) References Cited

U.S. PATENT DOCUMENTS

| 5,392,207 A | | 2/1995 | Wilson et al. ................. 700/64 |
| 5,408,603 A | * | 4/1995 | Van de Lavoir et al. ... 345/763 |
| 5,412,756 A | * | 5/1995 | Bauman et al. ................ 706/45 |

(Continued)

FOREIGN PATENT DOCUMENTS

| DE | 19715494 | | 10/1998 | ........... G05B/24/00 |
| DE | 19753704 | | 6/1999 | ........... B65B/19/28 |
| JP | 410234024 A | * | 9/1998 | ............ H04N/7/15 |
| WO | 0052536 | | 9/2000 | ......... G05B/19/409 |

OTHER PUBLICATIONS

Frank Wong et al, "The Rotating Machinery Workstation: For implementation of a condition based maintenance workstation", 1995, Houston TX, PennWell Conferences Exhibiitions, p319–329.*
C. S. Johnson et al, "Performance of Prototype Authentication Equipment for a C/S System at the Plutonium Fuel Production Facility", 1990, Sandia National Labs., Albuquerque, NM, Institute of nuclear materials management conference, Los Angeles, CA., p. 5.*
English Abstract of DE 19753704 Dated Jun. 10, 1999.
English Abstract of DE 19715494 Dated Oct. 22, 1998.

Primary Examiner—X. L. Bautista
(74) Attorney, Agent, or Firm—Ladas & Parry LLP (57) ABSTRACT

A method and automatic machine for processing a product, whereby, from all the regulating and/or monitoring items as a whole, a first group is determined containing a small number of frequently used items having a direct effect on the product; to permit fast use by an operator of the items in the first group, a screen of an interface device displays the items in the first group graphically by means of respective icons, each of which is connected to a synoptic background image showing the function of the relative item substantially in the region in which the relative item is actually effective.

22 Claims, 5 Drawing Sheets

U.S. PATENT DOCUMENTS

| | | | |
|---|---|---|---|
| 5,485,600 A | * | 1/1996 | Joseph et al. .................. 703/13 |
| 5,576,946 A | | 11/1996 | Bender et al. ................. 700/17 |
| 5,675,746 A | * | 10/1997 | Marshall ....................... 705/35 |
| 5,748,495 A | | 5/1998 | Arita et al. .................. 702/185 |
| 5,812,394 A | * | 9/1998 | Lewis et al. .................. 700/17 |
| 5,864,640 A | * | 1/1999 | Miramonti et al. ......... 382/312 |
| 5,880,716 A | | 3/1999 | Kunugi ....................... 345/173 |
| 6,134,644 A | * | 10/2000 | Mayuzumi et al. ............ 712/1 |
| 6,163,740 A | * | 12/2000 | Beltracchi .................. 700/286 |
| 6,289,299 B1 | * | 9/2001 | Daniel et al. .................. 703/21 |
| 6,366,300 B1 | * | 4/2002 | Ohara et al. ................. 345/771 |
| 6,377,263 B1 | * | 4/2002 | Falacara et al. ............. 345/473 |
| 6,396,516 B1 | * | 5/2002 | Beatty ......................... 345/764 |
| 6,414,679 B1 | * | 7/2002 | Miodonski et al. ......... 345/420 |
| 6,466,239 B2 | * | 10/2002 | Ishikawa .................... 345/850 |
| 2001/0025229 A1 | * | 9/2001 | Moritz et al. .................. 703/1 |
| 2003/0142091 A1 | * | 7/2003 | Minami et al. ............. 345/419 |

* cited by examiner

METHOD AND AUTOMATIC MACHINE FOR PROCESSING A PRODUCT

The present invention may be used to advantage on an automatic cigarette processing machine, to which the following description refers purely by way of example.

BACKGROUND OF THE INVENTION

Currently used automatic cigarette processing machines are extremely complicated both mechanically and electronically. In recent years, conventional drives with mechanisms powered by a main motor have been replaced with a number of independent drives, each synchronized with all the others; and, to improve product quality, increasingly sophisticated checks have been introduced for both direct product control (e.g. optical checks using television cameras) and process control (e.g. of sealing temperature using thermal sensors, of wrapping material supply, etc.).

As a consequence of the increasing use of electronics in the control of automatic machines, these now call for both mechanical setup (i.e. of the mechanical parts of the machine)—still necessary, even though to a lesser degree than before—and electronic setup (i.e. of the electronic parts of the machine), both of which must be performed not only when installing and testing the machine but also (albeit to a lesser extent) at subsequent manufacturing stages, e.g. when making product changes, alongside variations in raw material quality, or in the course of routine servicing or repairs.

Electronic setup comprises initializing and/or configuring both the application program (controlling the machine as a whole) and the various work station control programs (controlling individual parts of the machine) by means of an operator interface (or so-called "HMI" device) featuring a screen for displaying machine status and operation, and an input device (typically a keyboard and/or pointer) for receiving operator commands. More specifically, the operator interface provides for configuring the machine by permitting operator control of the various monitoring and/or regulating items by which the status and operation of the machine are displayed, and which enable the operator to set up and configure the machine as required.

On the operator interface of known automatic cigarette processing machines, the numerous regulating and monitoring items are indicated by groups of letters with associated text strings, whole lists of which are displayed on the operator interface screen, and which must be scrolled carefully even by a skilled operator to safely select the required regulating or monitoring item. This therefore involves a good deal of time, is subject to error, by similar strings easily being mistaken for one another, and calls for long, high-cost training of the operator who must have a thorough knowledge of the structure of the machine.

SUMMARY OF THE INVENTION

It is an object of the present invention to provide a product processing method designed to eliminate the aforementioned drawbacks and which at the same time is cheap and easy to implement.

According to the present invention, there is provided a method of processing a product on an automatic machine; the automatic machine comprising a set of regulating and/or monitoring items, and an operator interface having a display screen; and the method being characterized by comprising the steps of determining a first group of said regulating and/or monitoring items containing a small number of frequently used items; and displaying at least some items in the first group graphically on said screen by means of respective icons, each of which is connected to a synoptic background image showing the function of the relative item substantially in the region in which the relative item is actually effective.

The present invention also relates to an automatic product processing machine.

According to the present invention, there is provided an automatic machine for processing a product; the automatic machine comprising a set of regulating and/or monitoring items, and an operator interface having a display screen; and the machine being characterized by comprising interface means for determining a first group of said regulating and/or monitoring items containing a small number of frequently used items; and display means for displaying at least some items in the first group graphically on said screen by means of respective icons, each of which is connected to a synoptic background image showing the function of the relative item substantially in the region in which the relative item is actually effective.

BRIEF DESCRIPTION OF THE DRAWINGS

A non-limiting embodiment of the present invention will be described by way of example with reference to the accompanying Figures, in which.

DETAILED DESCRIPTION OF THE INVENTION

Figure 1:
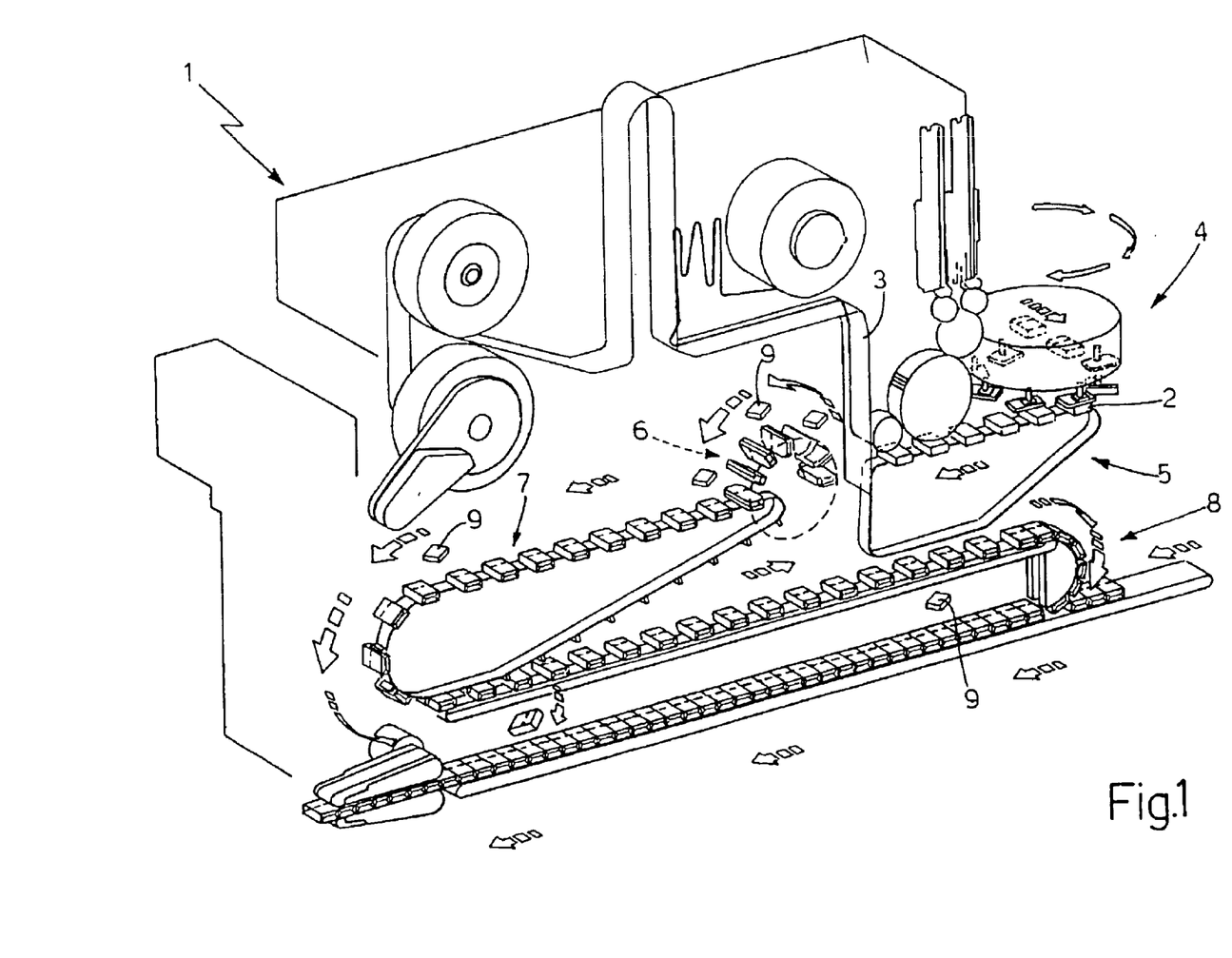
FIG. 1 shows a schematic view in perspective of an automatic machine for overwrapping packets of cigarettes and implementing the method according to the present invention.

Number 1 in FIG. 1 indicates as a whole a known automatic machine (in particular, a C800 machine produced by G.D. S.p.A.) for overwrapping packets 2 of cigarettes in respective sheets 3 of transparent plastic material.

Machine 1 comprises an input conveyor or spider 4 for transferring packets 2 onto a belt conveyor 5, which in turn feeds packets 2, together with respective sheets 3, onto a wrapping wheel 6, on which sheets 3 are folded about respective packets 2 to form tubular wrappings stabilized by a lateral heat seal. From wheel 6, the tubular wrappings are transferred onto a belt conveyor 7 and fed along a path along which sheets 3 are formed into finished wrappings about respective packets 2 and stabilized by end heat seals. From belt conveyor 7, packets 2 overwrapped in respective sheets 3 are transferred onto a drying conveyor 8 and subsequently fed to a follow-up automatic cartoning machine (not shown in FIG. 1).

Machine 1 comprises a number of known regulating and/or monitoring items 9 (shown schematically) for both direct product control (e.g. optical checks using television cameras) and process control (e.g. of sealing temperature using thermal sensors, of wrapping material supply, etc.) and/or for acting on and adjusting the configuration settings of the operating devices of machine 1 (e.g. adjusting the position of the wrapping material web, the temperature of the heat-seal devices, etc.).

Figure 2:
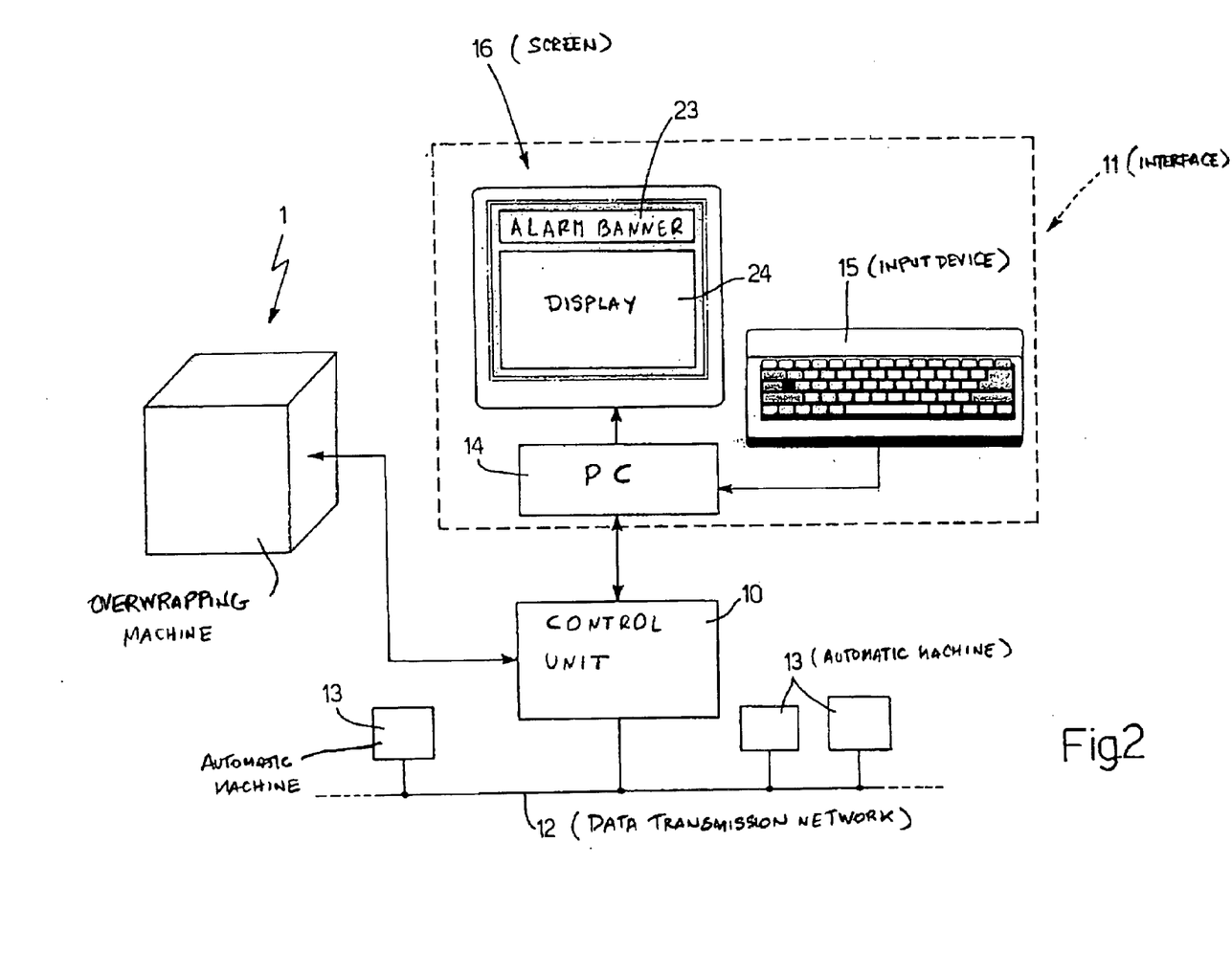
FIG. 2 shows a block diagram of a control and interface unit of the FIG. 1 machine.

As shown in FIG. 2, machine 1 comprises a control unit 10 connected to an interface (or so-called "HMI") device 11 allowing the operator to interact with control unit 10, and to a data transmission network 12 (normally in Fast-Ethernet technology) permitting information and/or command exchange with a number of other automatic machines 13 (e.g. a cigarette manufacturing machine, a cigarette packing machine, a cartoning machine, intermediate stores, etc.).

Interface device 11 comprises an industrial personal computer 14; an input device 15 (typically a keyboard and/or pointer) by which the operator supplies commands to control unit 10; and a screen 16 by which information is displayed by control unit 10. In a preferred embodiment, screen 16 also comprises a touch-screen device for simplifying command entry by the operator as an alternative to input device 15.

In a preferred embodiment, interface device 11 is shared by machine 1 and the other machines 13 connected to one another over transmission network 12, so that the operator, using input device 15, can select which machine 1, 13 to work on from a list of available machines 1, 13.

Personal computer 14 comprises interface software 17 (shown schematically in FIG. 3) by which control unit 10 of machine 1 communicates with the operator. Interface software 17 comprises a database 18 containing machine 1 data and parameters (status, production, rejects, alarms, etc.); a data communication protocol 19 for acquiring and memorizing field data in database 18 and for entering parameters into control unit 10 on the basis of the values in database 18; and display software 20, which is a package of intelligent graphic items for monitoring data on screen 16 or modifying parameters by means of input device 15. Display software 20 comprises guided visual interaction items permitting immediate, intuitive access to the data in database 18, and communicates with database 18 via a transmission library 21, or directly with control unit 10 via a transmission library 22.

Figure 3:
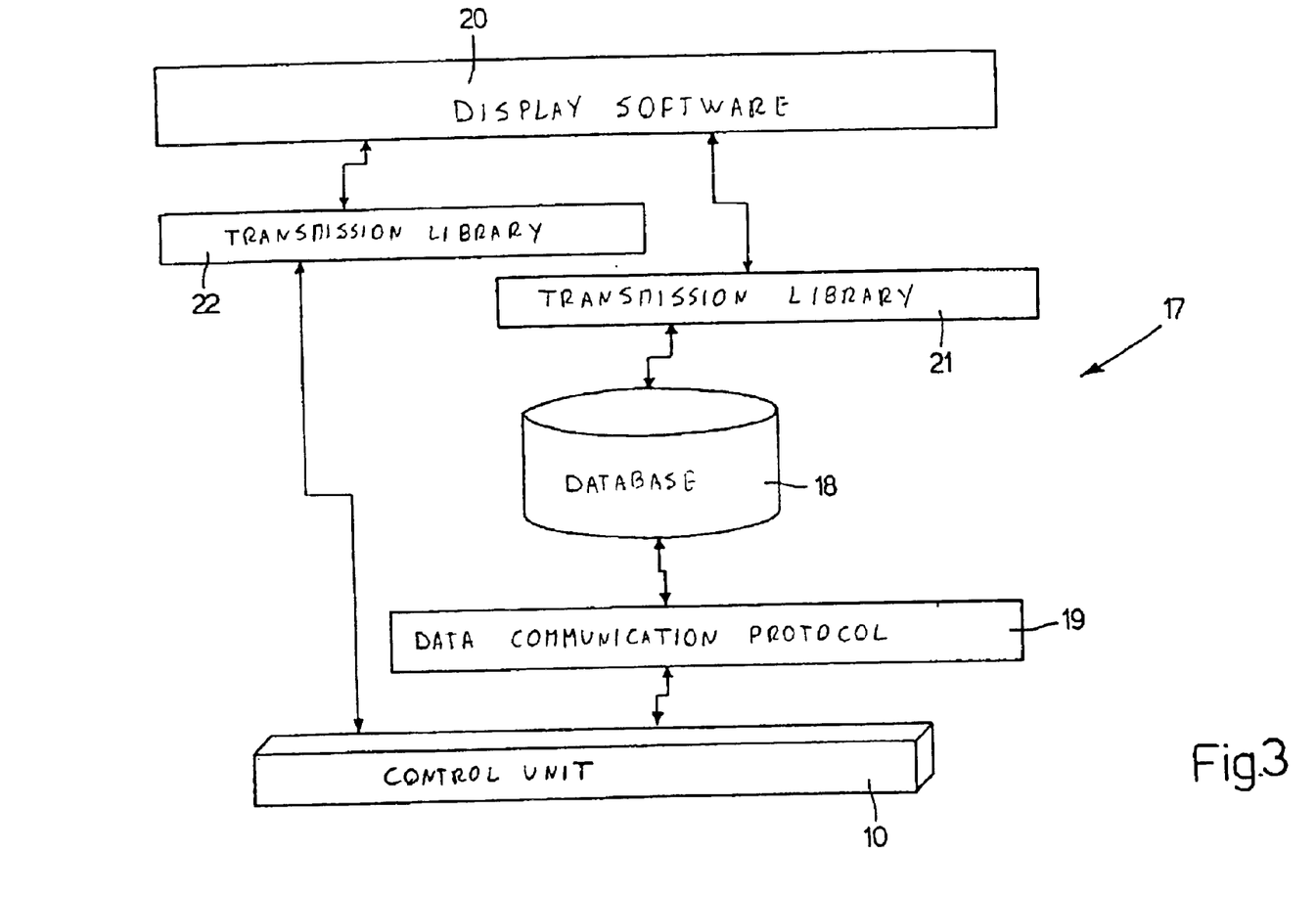
FIG. 3 shows a block diagram of a FIG. 2 control unit communication system.

Display software 20 normally uses transmission library 21 to dialog with database 18 and exchange information relating to the control and/or monitoring of machine 1, and uses transmission library 22 to dialog directly with control unit 10 to exchange information subject to strict time specifications (e.g. to display the machine angle). The presence of database 18 between data communication protocol 19 and display software 20 provides for separating data and parameter communication to/from control unit 10 from their respective graphic representation or modification items (detailed later on), so that the information concerning a particular machine or particular controller may be virtualized in generic items (e.g. speed, total production, total rejects, current alarm, etc.) available to the end user regardless of their specific implementation.

As shown in FIG. 2, screen 16 is always divided into a top portion 23 and a bottom portion 24. Top portion 23 (so-called "alarm banner") is always present and shows the machine alarms in text mode; whereas bottom portion 24 varies according to the operating conditions of machine 1 and/or operator requests, to show the requested details in graphic or text mode.

Figure 4:
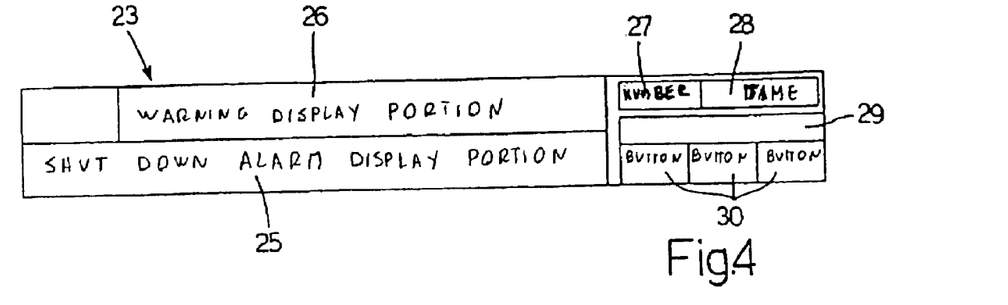
FIGS. 4, 5 and 6 show schematic layouts of various FIG. 2 control unit screen displays.

FIG. 4 shows one possible display layout of top portion 23 of screen 16, wherein top portion 23 comprises a shut-down alarm display portion 25; a warning display portion 26 (e.g. paper reel running out); a current shift number display portion 27; a date and time display portion 28; an in-process product name display portion 29; and a number of push-buttons 30.

Bottom portion 24 of screen 16 (shown, for example, in FIG. 7) is used by interface device 11 to allow the operator to control the regulating and/or monitoring items 9 on machine 1.

Regulating and/or monitoring items 9 as a whole are divided into a first group comprising frequently used items 9 having a direct effect on packets 2; and a second group comprising relatively seldom used items 9 (typically in cases of serious breakdowns or repairs) not having a direct effect on packets 2. Items 9 in the first group are used by standard operators in charge of the normal operation of machine 1, while those in the second group are used exclusively by highly skilled operators and machine 1 repair and/or service personnel. For example, machine 1 may comprise over five hundred regulating and/or monitoring items 9, of which only fifty to a hundred form part of the first group.

For bottom portion 24 of screen 16, the operator may choose between a text display identical with that currently used on known automatic machines and exclusive to highly skilled operators, and an easy-to-use, intuitive graphic display for standard operators. In a preferred embodiment, therefore, items 9 in the first group are displayed in both text and graphic mode, while those in the second group are displayed solely in text mode.

In a further embodiment, items 9 in both the first and second group are displayed graphically, though display of items 9 in the first group always differs from that of items 9 in the second group to adapt display to the ability of the user.

Figure 7:
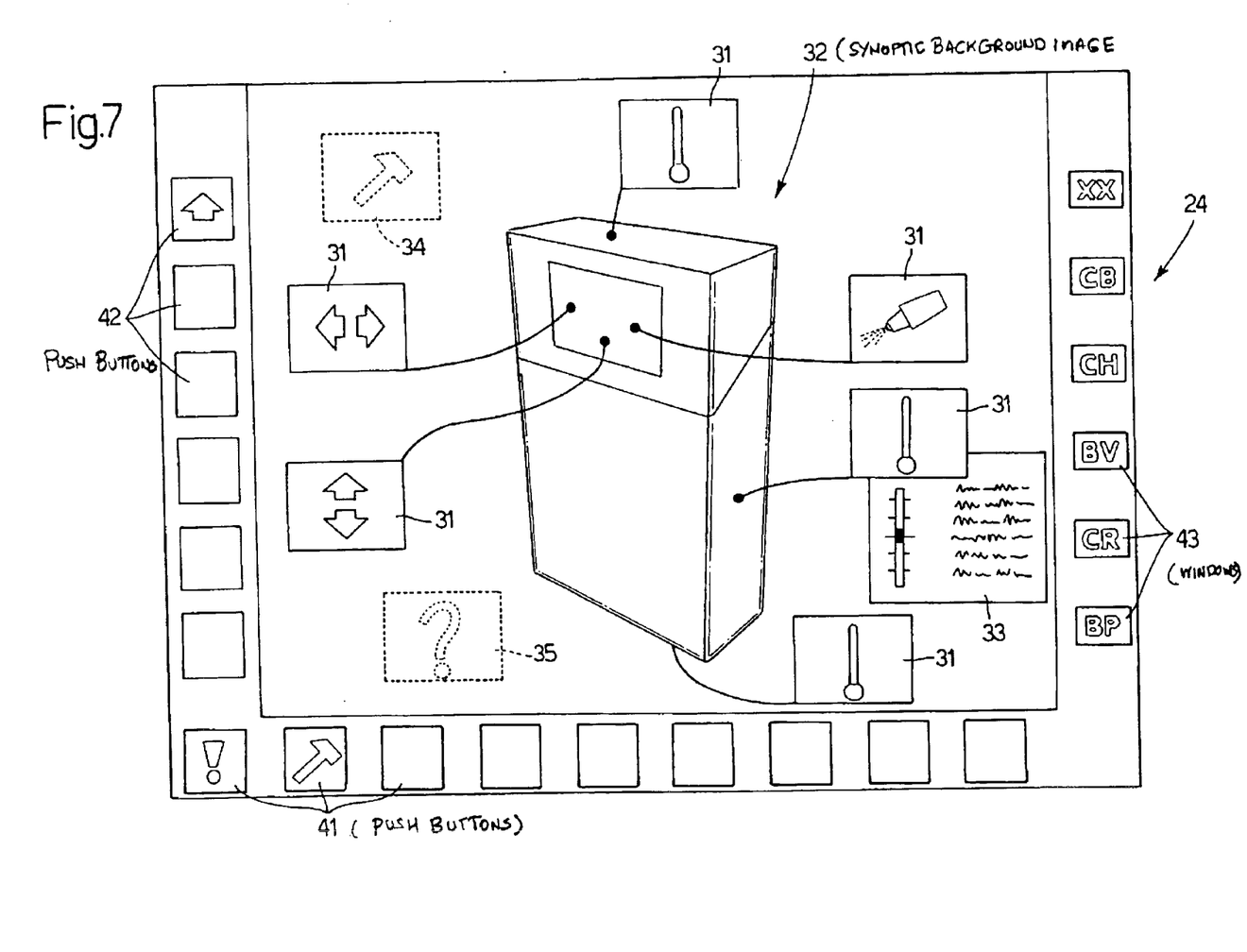
FIG. 7 shows a schematic layout of a further FIG. 2 control unit screen display.

As shown in FIG. 7, in graphic display mode, regulating and/or monitoring items 9 in the first group are shown by respective icons 31, each connected to a synoptic background image 32 showing the function of the relative item 9 substantially in the region in which the relative item 9 is actually effective. Each icon 31 is in the form of a drawing with substantially no writing and illustrating the function of respective item 9, or may be assigned a respective text string. In one possible embodiment, icons 31 may be animated to give a better idea of the function of respective items 9. In a preferred embodiment, all the first-group regulating and/or monitoring items 9 performing the same function are assigned substantially the same type of icon. In special cases, the same icon 31 may be assigned two or more items 9 having a similar function and/or effect.

To associate each icon 31 immediately to the location and/or function on machine 1 of the corresponding item 9, a number of synoptic background images 32 are memorized in interface device 11, each with its own degree of detail and each permitting simultaneous display of a respective group of icons 31, each of which is connected to a synoptic background image 32 substantially in the region in which the relative item 9 is actually effective.

Synoptic background images 32 are arranged in a tree structure with different levels, each with a respective degree of detail, and, by means of substantially known hypertext navigation means, the operator can select any of a number of available synoptic background images 32. In a preferred embodiment, to give a better idea of the functions of icons 31, these are only displayed together with synoptic background images 32 of a given minimum degree of detail, i.e. minimum scale or enlargement factor.

The tree arrangement of synoptic images 32 allows the operator to choose between two different types of synoptic background images 32: synoptic images 32a of machine 1 or synoptic images 32b of a packet 2 (FIGS. 7). A synoptic image 32a of machine 1 is one showing at least part of machine 1, and to which icons 31 are connected to superimpose each icon 31 on image 32a at the actual location of respective item 9. A synoptic image 32b of a packet 2 is one showing at least part of packet 2, and to which icons 31 are each connected to show the part of the packet affected by respective item 9.

In other words, synoptic images 32a of machine 1 are images of all or part of machine 1, and in combination with which each icon 31 is connected to synoptic image 32a at the actual location of respective item 9, whereas synoptic images 32b of a packet 2 are images of all or part of packet 2, and in combination with which each icon 31 is connected to synoptic image 32b in the region in which the respective item 9 is actually effective.

It should be pointed out that, by relating icons 31 to synoptic images 32b of a packet 2, a standard operator can see immediately the actual effect on packets 2 of the item 9 related to a given icon 31, even without any detailed knowledge of the structure of machine 1, thus enabling even relatively unskilled operators to interact with machine 1 to obtain packets 2 of the desired characteristics.

Interface device 11 can therefore be used easily and with substantially no risk of error even by a relatively unskilled operator, whose understanding of the function and use of items 9 in the first group is greatly assisted by icons 31.

Depending on the information to be transmitted to the operator, synoptic background images 32 may be two- or three-dimensional, and may be formed by digitizing photographs or by modeling CAD images. More specifically, three-dimensional images are solid three-dimensional models, formed using CAD-type tools, of machine 1 or packet 2. To display any concealed elements of three-dimensional synoptic background images 32, these may be rotated by the operator, or parts may be eliminated using known display tools. Finally, each synoptic background image 32 may be enlarged or reduced by the operator to display a given portion.

In a preferred embodiment, synoptic images 32a showing machine 1 as a whole are three-dimensional images formed by "rendering" CAD-type files; and, for easy reading, the various portions of machine 1 in synoptic images 32a are of different colors.

Using input device 15, the operator runs through and selects one of the various synoptic background images 32, and then selects a given icon 31 to display a respective window 33 containing operating details of the relative regulating and/or monitoring item 9. The operating details obviously depend on the type of item 9 in question, and are normally divided into display elements for displaying the status of a monitoring item 9, and regulating elements for receiving a command to vary the respective regulating parameters of a regulating item 9. The operating details shown in window 33 may also be animated to show the effect on packets 2 of the regulating and/or monitoring items related to the respective icon 31.

On automatic cigarette processing machines, user signals are generated fairly frequently. These are detailed in text mode in top portion 23 of screen 16 and relate to warnings, i.e. events requiring operator intervention (normally only cleaning or checking) but not resulting in stoppage of the machine, or to faults (typically, jamming of material supply), i.e. events resulting in machine stoppage and requiring immediate operator intervention. In response to a warning or fault signal, the operator may run through and select one of the various synoptic background images 32 using input device 15; or interface device 11 may automatically and independently display on screen 16 the synoptic image 32 best suited to respond to the signal.

It is common practice on automatic cigarette processing machines to carry out routine servicing to forestall the occurrence of faults or malfunctions. To make this easier, interface device 11 may also display graphically an icon 34 corresponding to a service item and informing the operator of the necessity to perform a given servicing job at a specific part of machine 1. More specifically, a service icon 34 is normally used in conjunction with a synoptic background image 32a of machine 1, and is connected to (i.e. superimposed on) the part of machine 1 for actual servicing. A service icon 34 is displayed on screen 16 at predetermined deadlines or in response to single or repeated malfunction signals (e.g. frequent jamming at a given part of the machine indicates cleaning is required). Alternatively, a service icon 34 may be displayed on screen 16 by request of the operator to show the programmed deadline for a given servicing job.

Interface device 11 may also display graphically an icon 35 corresponding to a help item and indicating how the operator is to perform a given job on machine 1 (e.g. to solve a given problem). Icon 35 is displayed automatically when a problem arises on machine 1, and, when selected, supplies the operator with all the necessary instructions to perform a given job by means of multimedia tools comprising, for example, photographs, a commented film and/or a series of self-teaching texts.

Figure 5:
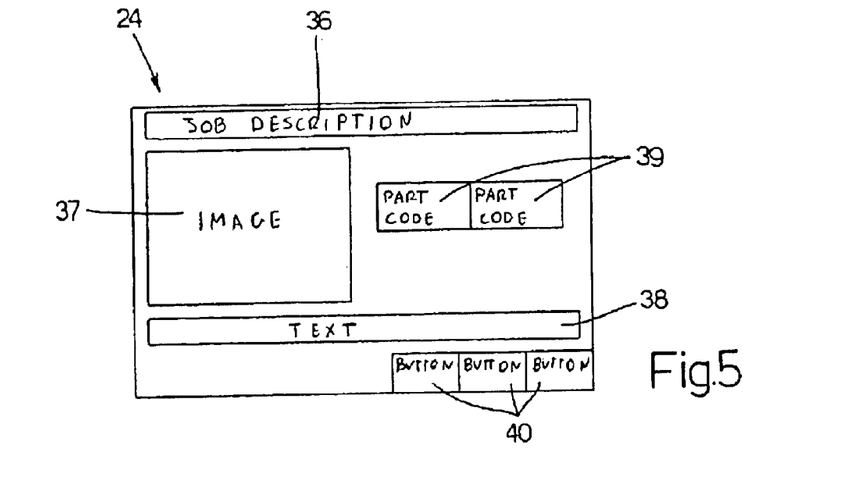
Figure 6:
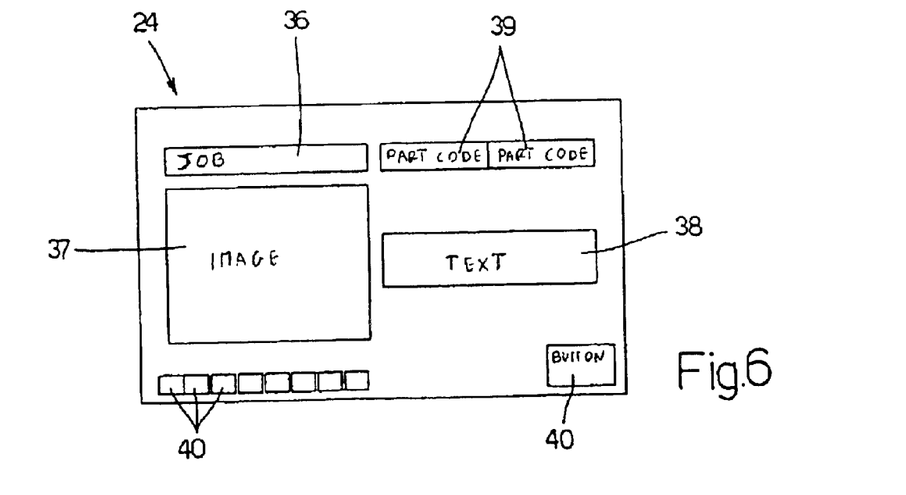

FIGS. 5 and 6 show possible operator-help layouts of bottom portion 24 of screen 16. More specifically, portion 24 comprises a job description portion 36; a portion 37 for showing photographs and/or films; a text display portion 38; a part code display portion 39; and push-buttons 40.

As shown in FIG. 7, bottom portion 24 comprises a central portion displaying a synoptic background image 32 and framed on three sides by a bottom portion with push-buttons 41 for displaying given groups of icons 31 and/or given information, by a left-side portion with push-buttons 42 for running through synoptic images 32 and selecting which machine 1, 13 to work on, and by a right-side portion with windows 43 for displaying the operating status of machines 1, 13. Windows 43 and push-buttons 42 are fixed and are always displayed regardless of what is shown in the central portion, whereas push-buttons 41 vary according to the central portion display.

By way of example, a synoptic background image 32a of the wrapping wheel 6 region could show three icons 31 relative to the operating temperature of the three lateral-face sealing devices cooperating with wrapping wheel 6. An icon 31 could be shown with the corresponding window 33 having display elements for monitoring the operating temperature of the respective sealing device, and regulating elements for adjusting the operating temperature.

By way of example, a photographic three-dimensional synoptic background image 32a of the wrapping wheel 6 region could show a service icon 34 and the relative window 33 could show the deadline for cleaning the sealing devices of wrapping wheel 6.

By way of example, a photographic three-dimensional synoptic background image 32a of the drying conveyor 8 region could show three icons 31 with respective windows 33 relative to the control and reject devices cooperating with drying conveyor 8.

By way of example, a photographic three-dimensional synoptic background image 32a the drying conveyor 8 region could show three icons 31 with respective windows 33 relative to the heating element bypass devices cooperating with drying conveyor 8.

By way of example, a three-dimensional synoptic background image 32a of a complete packet 2 could show six icons 31 relative to the operating temperature of the sealing devices and the overlap dimension of portions of sheet 3 of overwrapping material.

By way of example, a three-dimensional synoptic background image 32a of a complete packet 2 could show three icons 31 relative to the operating temperature of the three lateral-face sealing devices cooperating with wrapping wheel 6. An icon 31 could be shown with the corresponding window 33 having display elements for monitoring the operating temperature of the respective sealing device, and regulating elements for adjusting the operating temperature.

In a preferred embodiment not shown, interface device 11 also comprises a help section for solving routine problems on machine 1. In response to user selection of the help section by means of input device 15, bottom portion 24 of screen 16 displays a sequence of diagnostic images, each showing the effect of a given problem on machine 1 and/or packets 2. For example, to illustrate overheating of the lateral-face sealing devices, the corresponding image shows a packet 2 with a shriveled lateral-face seal side. In response to selection of a given diagnostic image, descriptions are provided of the problem and possible causes, and a list is shown of steps to be taken to solve the problem. The list is arranged in decreasing order of probable success, and the steps listed may be detailed in the form of text strings only, or together with images, photographs or animation, possibly with sound.

As such, even an operator with relatively little experience of machine 1 can diagnose and solve routine problems by simply observing the packets 2 coming off machine 1.

Finally, in a preferred embodiment not shown, interface device 11 also comprises a productivity check section showing, for the current work shift, the production target, current production, estimated end-of-shift production, and current rejects. The above values are expressed in numbers of packets 2 (i.e. numbers of units produced on machine 1) and are displayed both numerically and by bar graphs for fast comparison. Estimated end-of-shift production is determined on the basis of the statistical mean of preceding shifts or by projecting current-shift performance.

The operator is therefore able to intervene on machine 1 to effect given variations in the characteristics of packets 2 without, however, necessarily knowing the actual working of machine 1. That is, using synoptic background images 32b of packet 2, the operator is able to vary the characteristics of packets 2 quite easily even without knowing how machine 1 actually brings about such variations.

What is claimed is:

1. A method of processing a product on an automatic machine comprising the steps of
    feeding the product along a processing path;
    subjecting the product to a number of processing steps while the product is fed alone the processing path;
    supervising the processing steps by a set of regulating and/or monitoring items;
    determining a first group of said regulating and/or monitoring items containing a small number of frequently used items, which have a direct effect on the processing of the product; and
    displaying at least some items in the first group graphically on screen by means of respective icons, each of which is connected to a synoptic background image of at least one part of the product showing the function of a relative item on the product; wherein said icons are connected to said synoptic background image in the regions in which the relative items are actually effective.

2. A method as claimed in claim 1, wherein at least one said icon is assigned two or more said regulating and/or monitoring items in said first group.

3. A method as claimed in claim 1, wherein the user may select said synoptic background image from a number of synoptic images of the product each showing the product or part of the product in a respective degree of detail; each said icon being connected to at least one respective said synoptic image of the product.

4. A method as claimed in claim 3, wherein said synoptic images are arranged in a tree structure having different levels, each having a respective degree of detail.

5. A method as claimed in claim 1, wherein said synoptic images are two-dimensional images.

6. A method as claimed in claim 5, wherein said two-dimensional synoptic images are formed by digitizing photographs.

7. A method as claimed in claim 1, wherein said synoptic images are three-dimensional images.

8. A method as claimed in claim 7, wherein said each said three-dimensional synoptic background image is a solid three-dimensional model.

9. A method as claimed in claim 8, wherein said each said three-dimensional synoptic background image can be rotated.

10. A method as claimed in claim 7, wherein said parts may be eliminated from each said three-dimensional synoptic background image.

11. A method as claimed in claim 1, wherein said each said synoptic background image can be enlarged to display a given portion of the synoptic background image.

12. A method as claimed in claim 1, said regulating and/or monitoring items in the first group are divided according to function; all the regulating and/or monitoring items in the first group having the same function being assigned an icon of substantially the same type.

13. A method as claimed in claim 1, wherein, in response to selection of a given said icon, a window is displayed containing operating details of the relative said regulating and/or monitoring item.

14. A method as claimed in claim 13, wherein said operating details of a regulating item comprise means for receiving a command to vary the respective regulating parameters.

15. A method as claimed in claim 13, wherein said operating details of a regulating item comprise animation to show the effect the action of the regulation item has on said product.

16. A method as claimed in claim 1, wherein said screen shows graphically at least a first further icon corresponding to a service item and indicating the necessity to perform a given service job.

17. A method as claimed in claim 16, wherein said first further icon is shown on the screen at predetermined deadlines.

18. A method as claimed in claim 1, said screen shows graphically at least a second further icon corresponding to a help item and showing the operator the manner in which to perform a given job on the machine.

19. A method as claimed in claim 18, wherein said second further icon is shown automatically on the screen when a problem arises on the machine.

20. A method as claimed in claim 18, wherein said manner in which to perform a given job is detailed in the form of text strings, images, photographs and/or animation.

21. A method as claimed in claim 20, said animation is provided with sound.

22. An automatic machine for processing a product; the automatic machine comprising
    feeding devices for feeding the product along a processing path;

processing elements arranged along the processing path for subjecting the product to a number of processing steps;

a set of regulating and/or monitoring items for supervising the processing elements an operator interface having a display screen;

interface means for determining a first group of said regulating and/or monitoring items containing a small number of frequently used items which have a direct effect on the processing of the product; and display means for displaying at least some items in the first group graphically on said screen by means of respective icons, each of which is connected to a synoptic background image of at least one part of the product showing the function of the relative item on the product; wherein said icons are connected to said synoptic background image in the regions in which the relative items are actually effective.

* * * * *

UNITED STATES PATENT AND TRADEMARK OFFICE
CERTIFICATE OF CORRECTION

PATENT NO. : 6,892,358 B2  
APPLICATION NO. : 09/978843  
DATED : May 10, 2005  
INVENTOR(S) : Fiorenzo Draghetti et al.

It is certified that error appears in the above-identified patent and that said Letters Patent is hereby corrected as shown below:

On title page, item 73 "G. D." should read -- G. D -- and "Battindarno" should read -- Bologna --.

Signed and Sealed this

Twenty-ninth Day of April, 2008

JON W. DUDAS  
*Director of the United States Patent and Trademark Office*